United States Patent Office 3,455,421
Patented July 15, 1969

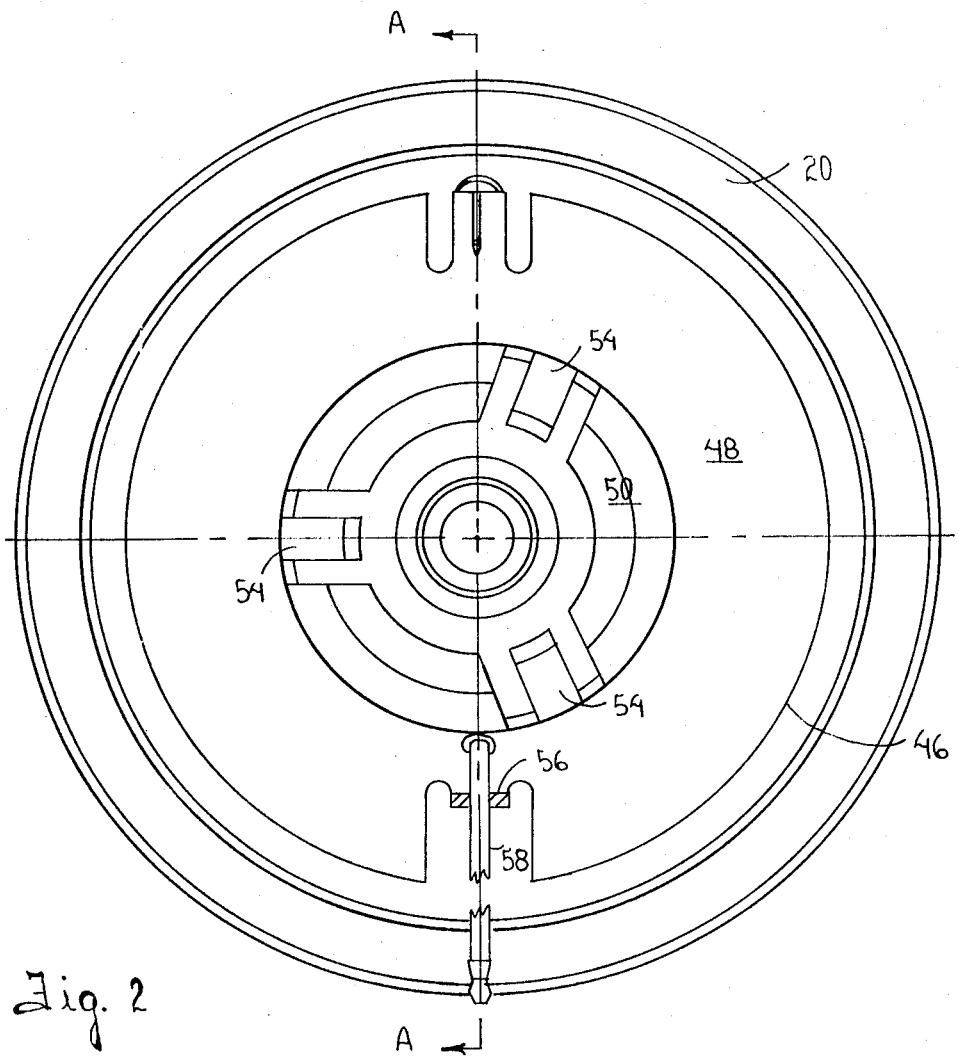

3,455,421
STATIONARY FIELD CLUTCH
Donald L. Miller, Horseheads, N.Y., assignor to The
Bendix Corporation, a corporation of Delaware
Filed June 12, 1967, Ser. No. 645,309
Int. Cl. F16d 27/00, 37/02, 19/00
U.S. Cl. 192—84          4 Claims

ABSTRACT OF THE DISCLOSURE

The present invention relates ot a clutch having a stationary coil and/or field wherein the fixed coil support structure consists of an annular sheet metal stamped plate member of slightly flexible construction. The arrangement permits slight deflection of the annular support member against a fixed machine housing or the like on which it is to be mounted, permitting attachment by means of a single low tolerance snap-on connection while providing a good stability against vibration of the clutch unit. Formed integrally with the annular support member are a plurality of flexible fingers providing firm loading for the clutch bearing. A further tab is provided on the annular support member to lock the stationary coil against rotation.

---

Figure 1:
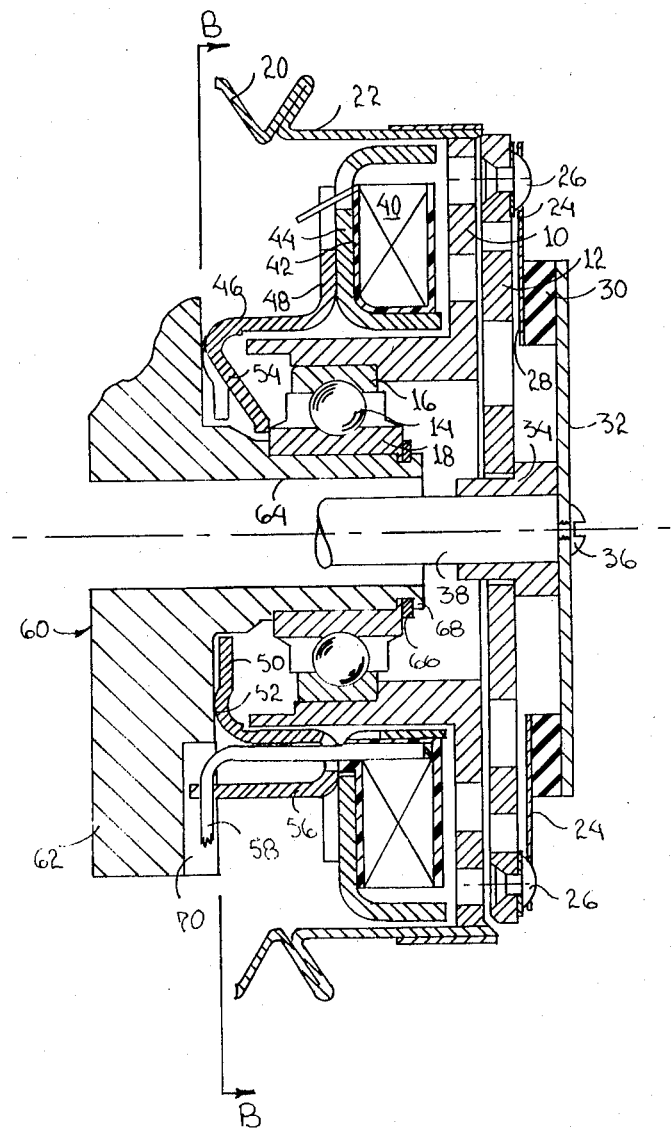

It is an objective of the present invention to provide a clutch design which can be economically manufactured and which may be quickly and easily installed or removed from an associated machine by a simple snap-ring connection.

Other objects and advantages will become apparent on consideration of the attached description and drawings wherein:

FIGURE 1 is a section view of a clutch in accordance with the present invention and its mounted relationship with respect to a machine housing fragmentarily illustrated. The section line of FIGURE 1 follows section line A—A of FIGURE 2; and, FIGURE 2 is an end view of my clutch from plane B—B of FIGURE 1 showing in particular an annular support member of the present invention.

Referring to the drawings, my clutch is comprised of first and second annular rotatable torque transmitting members 10 and 12 respectively. Member 10 is axially fixed or located and supported by ball bearing 14 having a rotatable outer race 16 and a fixed inner race 18. Bearing 14, for additional stability, may be a roller or multiple row ball bearing if desired. Input drive means consist of a V-belt drive groove 20 formed in the outer ring member 22 which is secured to the outer radial edge of torque transmitting member 10 to provide a driving connection.

The second torque transmitting member 12 is an armature plate member comprised of flux-conducting material, as in member 10, and is axially movable to a limited extent whereby it may be brought into contactive engagement with member 10 to transmit torque. As illustrated, member 12 is in a disengaged position spaced from member 10. A plurality of spring members 24 are attached by rivets 26 to second torque transmitting member 12 providing a normally disengaged spring bias. The spring members merge into a continuous annular ring 28 to which is bonded a rubber ring 30 and which, in turn, is attached to drive plate or spider 32. A drive bushing attachment 34 is affixed to plate 32 and along with screw 36 provides a drive attachment with driven shaft 38.

Selective movement of second torque transmitting member 12 into engagement with member 10 against the bias of springs 24 is obtained by flux attraction generated by electromagnetic coil 40 which is formed as an annulus and closely spaced with respect to member 10. Coil 40 is wound on plastic bobbin 42 which is fixedly set in annular channel-shaped magnet body member 44.

Magnet body member 44 is both axially and non-rotatably supported by an annular sheet metal support member 46, shown in plan view in FIGURE 2. Support member 46 is a formed sheet metal member having a degree of flexibility in the clutch axial direction and consists of a radially-outer flange section 48 which provides an attachment flange for magnet body 44 and a central hub-like section 50 which encompasses on one side the bearing 14. Hub section 50 has an annular abutment ridge or surface 52 for purposes as will be later described. Three bent tab flexible spring fingers 54 are formed in the central hub section and bear against the inner race 18 of bearing 14, providing an axial side load on the bearing. Support member 46 has an additional tab 56 bent over and extending axially beyond ridge 52 to restrain member 46 against rotation and provide a guiding finger for coil wire 58.

Associated with my clutch there is illustrated fragmentarily a portion of a typical machine housing 60 with which the clutch is to be used. This housing consists of a fixed wall 62 and a projecting mounting sleeve 64. When mounted as illustrated, inner race 18 of bearing 14 is supported by the outer surface of sleeve 64 and ridge 52 abuts against wall 62, developing a reaction force which, through spring fingers 54, axially loads the bearing race in one direction. The arrangement permits the clutch to be fully located in the axial direction by a single snap-ring 66 set in a grove 68, forming a stop abutment for the right edge of inner race 18. Tolerances are less critical and hence, cost is reduced from prior arrangements since the flexibility of support 46 permits considerable locating latitude and good stability is, nevertheless, obtained by spring loading of the bearing and stabilization contact of ridge 52 with the housing wall. A radial groove 70 is formed in housing wall 62 and receives non-rotation tab 56 and provides a channel for the passage of wire 58.

The arrangement further provides quick and easy removal of the clutch for service or the like by a single snap-ring disconnect which is a particularly important feature in the automotive field.

I claim:
1. A stationary field, electromagnetically-controlled clutch adapted to be mounted on a fixed housing having a a wall and projecting mounting sleeve:
  a first and second annular rotatable torque transmitting members, at least one of said annular torque transmitting members selectively movable in an axial direction between engaged and disengaged positions with the other of said annular torque transmitting members;
  input drive means connected to said first annular rotatable torque transmitting member for supplying a rotating input thereto;
  output drive means connected to said second annular rotatable torque transmitting member;
  electromagentic coil means operative when energized to generate magnetic flux selectively controlling engagement and disengagement of said first and second annular torque transmitting members;
  bearing means connected to the radially-inner circumference of said first annular torque transmitting member, said bearing means adapted to be mounted on the projecting mounting sleeve; and
  an annular support member of formed plate construction connected to said electromagnetic coil means at its outer periphery to provide a fixed support therefor, an abutment surface formed on said support member intermediate radially-inner and outer edges thereof adapted to abut against the wall of the fixed housing, and a plurality of spring fingers formed in said support member adjacent the radially-inner edge thereof, said spring fingers contacting said bearing means applying an axial load force thereagainst.

2. A stationary field, electromagnetically-controlled clutch as claimed in claim 1 wherein said abutment surface is an annular ridge formed in said support member.

3. A stationary field, electromagnetically-controlled clutch as claimed in claim 1 wherein said spring fingers are comprised of bent tabs extending generally radially in said support member.

4. A stationary field, electromagnetically-controlled clutch as claimed in claim 1 wherein said annular support member has an axially-extending tab formed therein adapted to restrain said annular support member rotationally.

References Cited

UNITED STATES PATENTS 2,703,378   3/1955   Hart.
2,919,777   1/1960   Walter.

CARLTON R. CROYLE, Primary Examiner

A. D. HERRMANN, Assistant Examiner